(12) United States Patent
Chae

(10) Patent No.: US 9,829,683 B2
(45) Date of Patent: Nov. 28, 2017

(54) LENS MODULE

(71) Applicant: Samsung Electro-Mechanics Co., Ltd., Suwon-si (KR)

(72) Inventor: Kyu Min Chae, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 14/943,499

(22) Filed: Nov. 17, 2015

(65) Prior Publication Data

US 2016/0161717 A1    Jun. 9, 2016

(30) Foreign Application Priority Data

Dec. 8, 2014  (KR) .................. 10-2014-0175021

(51) Int. Cl.
*G02B 3/02*     (2006.01)
*G02B 13/18*    (2006.01)
*G02B 13/00*    (2006.01)

(52) U.S. Cl.
CPC ............................ *G02B 13/0045* (2013.01)

(58) Field of Classification Search
CPC .. G02B 13/0045; G02B 9/62; G02B 27/0025; G02B 13/18; G02B 3/04; G02B 5/005; G02B 13/0015; G02B 13/04; G02B 13/00; G02B 13/002; G02B 13/06; G02B 5/208; G02B 7/021; G02B 13/006; G02B 13/16; G02B 1/041; G02B 27/646
See application file for complete search history.

(56) References Cited

U.S. PATENT DOCUMENTS

| 7,453,654 B2 | 11/2008 | Shinohara |
| 8,179,618 B2 * | 5/2012 | Baba .................. G02B 13/0045 |
| | | 359/714 |
| 8,687,292 B2 | 4/2014 | Tsai et al. |

(Continued)

FOREIGN PATENT DOCUMENTS

| CN | 202854391 U | 4/2013 |
| CN | 103792646 A | 5/2014 |

(Continued)

OTHER PUBLICATIONS

Chinese Office Action dated Aug. 30, 2017 in counterpart Chinese Application No. 201510857300.6 (6 pages in English; 5 pages in Chinese).

*Primary Examiner* — James Greece
*Assistant Examiner* — Sharrief Broome
(74) *Attorney, Agent, or Firm* — NSIP Law

(57) ABSTRACT

A lens module includes a first lens having negative refractive power, an object-side surface thereof being convex and an image-side surface thereof being concave; a second lens having an object-side surface that is convex; a third lens having an object-side surface that is concave and an image-side surface that is convex; a fourth lens having an object-side surface that is concave; a fifth lens having an object-side surface that is concave and an image-side surface that is convex; and a sixth lens having an object-side surface is convex and having one or more inflection points on an image-side surface thereof. The first to sixth lenses are sequentially disposed in numerical order from the first lens to the sixth lens from an object side of the lens module toward an image side of the lens module.

17 Claims, 16 Drawing Sheets

(56) References Cited

U.S. PATENT DOCUMENTS

| | | |
|---|---|---|
| 8,743,477 B2 | 6/2014 | Tsai et al. |
| 2011/0134305 A1 | 6/2011 | Sano et al. |
| 2014/0009844 A1* | 1/2014 | Tsai .................. G02B 9/62 |
| | | 359/713 |
| 2014/0092491 A1 | 4/2014 | Hsu et al. |
| 2014/0118844 A1 | 5/2014 | Tsai et al. |
| 2015/0022905 A1 | 1/2015 | Shinohara et al. |
| 2015/0346459 A1* | 12/2015 | Chen ............... G02B 13/0045 |
| | | 348/335 |

FOREIGN PATENT DOCUMENTS

| | | |
|---|---|---|
| CN | 203981955 U | 12/2014 |
| KR | 10-2011-0042382 A | 4/2011 |
| TW | 201243386 A1 | 11/2012 |

* cited by examiner

| SURFACE NO. | RADIUS OF CURVATURE | THICKNESS /DISTANCE | REFRACTIVE INDEX | ABBE NUMBER | REMARK |
|---|---|---|---|---|---|
| OBJECT | Infinity | Infinity | | | |
| 1 | 2.446 | 0.280 | 1.620 | 25.6 | FIRST LENS |
| 2 | 1.391 | 0.080 | | | |
| 3 | 0.959 | 0.493 | 1.537 | 56.3 | SECOND LENS |
| 4 | 35.002 | 0.366 | | | |
| 5 | −1.383 | 0.416 | 1.537 | 56.3 | THIRD LENS |
| 6 | −1.058 | 0.080 | | | |
| 7 | −2.254 | 0.300 | 1.620 | 25.6 | FOURTH LENS |
| 8 | −20.951 | 0.080 | | | |
| 9 | −3.134 | 0.467 | 1.537 | 56.3 | FIFTH LENS |
| 10 | −1.878 | 0.080 | | | |
| 11 | 1.895 | 0.809 | 1.537 | 56.3 | SIXTH LENS |
| 12 | 1.165 | 0.373 | | | |
| 13 | Infinity | 0.373 | 1.517 | 64.2 | FILTER |
| 14 | Infinity | 0.230 | | | |
| IMAGE PLANE | Infinity | − | − | − | |

FIG. 3

| Ex.1 | CONIC (K) | 4TH ORDER (A) | 6TH ORDER (B) | 8TH ORDER (C) | 10TH ORDER (D) | 12TH ORDER (E) | 14TH ORDER (F) |
|---|---|---|---|---|---|---|---|
| 1 | 0.00000 | -0.01658 | 0.07983 | -0.10329 | 0.02151 | 0.00000 | 0.00000 |
| 2 | 0.00000 | -0.15776 | 0.65628 | -0.99229 | 0.87864 | 0.00000 | 0.00000 |
| 3 | 0.00000 | -0.23985 | 0.53839 | -0.93669 | 0.82008 | 0.00000 | 0.00000 |
| 4 | 0.00000 | -0.11481 | -0.10176 | 0.30123 | -0.34399 | 0.00000 | 0.00000 |
| 5 | 0.00000 | -0.17411 | -0.11830 | 0.63944 | -1.28307 | 0.00000 | 0.00000 |
| 6 | 0.00000 | -0.00229 | -0.03889 | 0.05752 | -0.01109 | 0.00000 | 0.00000 |
| 7 | 0.00000 | -0.02501 | -0.28178 | 0.19116 | -0.23345 | 0.00000 | 0.00000 |
| 8 | 0.00000 | -0.06736 | -0.00670 | -0.00082 | 0.01729 | 0.00000 | 0.00000 |
| 9 | 0.00000 | 0.01177 | -0.02613 | 0.01999 | -0.00512 | 0.00000 | 0.00000 |
| 10 | 0.00000 | 0.03123 | -0.02877 | 0.01777 | -0.00393 | 0.00000 | 0.00000 |
| 11 | 0.00000 | -0.30319 | 0.11907 | -0.02169 | 0.00018 | 0.00013 | 0.00000 |
| 12 | -1.00000 | -0.32486 | 0.18137 | -0.07763 | 0.02108 | -0.00319 | 0.00020 |

FIG. 4

| SURFACE NO. | RADIUS OF CURVATURE | THICKNESS /DISTANCE | REFRACTIVE INDEX | ABBE NUMBER | REMARK |
|---|---|---|---|---|---|
| OBJECT | Infinity | Infinity | | | |
| 1 | 2.183 | 0.289 | 1.620 | 25.6 | FIRST LENS |
| 2 | 1.302 | 0.080 | | | |
| 3 | 0.940 | 0.486 | 1.537 | 56.3 | SECOND LENS |
| 4 | 11.222 | 0.363 | | | |
| 5 | -1.414 | 0.404 | 1.537 | 56.3 | THIRD LENS |
| 6 | -1.113 | 0.080 | | | |
| 7 | -2.258 | 0.300 | 1.620 | 25.6 | FOURTH LENS |
| 8 | -26.654 | 0.080 | | | |
| 9 | -6.770 | 0.501 | 1.537 | 56.3 | FIFTH LENS |
| 10 | -2.114 | 0.080 | | | |
| 11 | 1.918 | 0.783 | 1.537 | 56.3 | SIXTH LENS |
| 12 | 1.143 | 0.373 | | | |
| 13 | Infinity | 0.300 | 1.517 | 64.2 | FILTER |
| 14 | Infinity | 0.239 | | | |
| IMAGE PLANE | Infinity | — | — | — | |

FIG. 7

| Ex.2 | CONIC (k) | 4TH ORDER (A) | 6TH ORDER (B) | 8TH ORDER (C) | 10TH ORDER (D) | 12TH ORDER (E) | 14TH ORDER (F) |
|---|---|---|---|---|---|---|---|
| 1 | 0.00000 | 0.01396 | 0.10053 | -0.09249 | 0.01273 | 0.00000 | 0.00000 |
| 2 | 0.00000 | -0.21346 | 0.86967 | -1.24272 | 0.85227 | 0.00000 | 0.00000 |
| 3 | 0.00000 | -0.31706 | 0.82432 | -1.48470 | 1.34133 | 0.00000 | 0.00000 |
| 4 | 0.00000 | -0.08756 | 0.01086 | -0.09008 | 0.37019 | 0.00000 | 0.00000 |
| 5 | 0.00000 | -0.28174 | -0.14961 | 0.46194 | -1.17677 | 0.00000 | 0.00000 |
| 6 | 0.00000 | 0.10719 | -0.49440 | 0.38929 | 0.15097 | 0.00000 | 0.00000 |
| 7 | 0.00000 | 0.12306 | -0.73540 | 0.75631 | -0.63357 | 0.00000 | 0.00000 |
| 8 | 0.00000 | -0.09288 | 0.00513 | -0.08374 | 0.08004 | 0.00000 | 0.00000 |
| 9 | 0.00000 | 0.10328 | -0.13801 | 0.10113 | -0.02459 | 0.00000 | 0.00000 |
| 10 | 0.00000 | 0.04871 | 0.01258 | 0.00888 | -0.00404 | 0.00000 | 0.00000 |
| 11 | 0.00000 | -0.30936 | 0.12622 | -0.02702 | 0.00286 | -0.00027 | 0.00000 |
| 12 | -1.00000 | -0.29325 | 0.15047 | -0.05834 | 0.01379 | -0.00178 | 0.00009 |

FIG. 8

| SURFACE NO. | RADIUS OF CURVATURE | THICKNESS /DISTANCE | REFRACTIVE INDEX | ABBE NUMBER | REMARK |
|---|---|---|---|---|---|
| OBJECT | Infinity | Infinity | | | |
| 1 | 3.317 | 0.280 | 1.620 | 25.6 | FIRST LENS |
| 2 | 1.705 | 0.080 | | | |
| 3 | 1.165 | 0.499 | 1.537 | 56.3 | SECOND LENS |
| 4 | −5.127 | 0.455 | | | |
| 5 | −1.111 | 0.440 | 1.537 | 56.3 | THIRD LENS |
| 6 | −0.979 | 0.080 | | | |
| 7 | −3.031 | 0.300 | 1.620 | 25.6 | FOURTH LENS |
| 8 | −100.000 | 0.080 | | | |
| 9 | −12.534 | 0.492 | 1.537 | 56.3 | FIFTH LENS |
| 10 | −3.304 | 0.080 | | | |
| 11 | 1.913 | 0.655 | 1.537 | 56.3 | SIXTH LENS |
| 12 | 1.083 | 0.373 | | | |
| 13 | Infinity | 0.300 | 1.517 | 64.2 | FILTER |
| 14 | Infinity | 0.241 | | | |
| IMAGE PLANE | Infinity | − | − | − | |

FIG. 11

| Ex.3 | CONIC (K) | 4TH ORDER (A) | 6TH ORDER (B) | 8TH ORDER (C) | 10TH ORDER (D) | 12TH ORDER (E) | 14TH ORDER (F) |
|---|---|---|---|---|---|---|---|
| 1 | 0.00000 | −0.01350 | 0.07713 | −0.10465 | 0.02333 | 0.00000 | 0.00000 |
| 2 | 0.00000 | −0.15396 | 0.65410 | −1.01971 | 0.91516 | 0.00000 | 0.00000 |
| 3 | 0.00000 | −0.23812 | 0.54174 | −0.96917 | 0.86056 | 0.00000 | 0.00000 |
| 4 | 0.00000 | −0.11721 | −0.09943 | 0.28885 | −0.32940 | 0.00000 | 0.00000 |
| 5 | 0.00000 | −0.19280 | −0.10267 | 0.60141 | −1.26457 | 0.00000 | 0.00000 |
| 6 | 0.00000 | 0.00161 | −0.04551 | 0.03218 | 0.01424 | 0.00000 | 0.00000 |
| 7 | 0.00000 | −0.02269 | −0.30251 | 0.20776 | −0.25814 | 0.00000 | 0.00000 |
| 8 | 0.00000 | −0.05204 | −0.02471 | 0.00584 | 0.01897 | 0.00000 | 0.00000 |
| 9 | 0.00000 | 0.04666 | −0.06616 | 0.04527 | −0.01175 | 0.00000 | 0.00000 |
| 10 | 0.00000 | 0.03614 | −0.02773 | 0.01921 | −0.00509 | 0.00000 | 0.00000 |
| 11 | 0.00000 | −0.30474 | 0.11806 | −0.01806 | −0.00178 | 0.00046 | 0.00000 |
| 12 | −1.00000 | −0.33658 | 0.19249 | −0.08434 | 0.02332 | −0.00356 | 0.00022 |

FIG. 12

| SURFACE NO. | RADIUS OF CURVATURE | THICKNESS /DISTANCE | REFRACTIVE INDEX | ABBE NUMBER | REMARK |
|---|---|---|---|---|---|
| OBJECT | Infinity | Infinity | | | |
| 1 | 3.383 | 0.280 | 1.620 | 25.6 | FIRST LENS |
| 2 | 1.722 | 0.080 | | | |
| 3 | 1.186 | 0.499 | 1.537 | 56.3 | SECOND LENS |
| 4 | -4.905 | 0.477 | | | |
| 5 | -1.093 | 0.450 | 1.537 | 56.3 | THIRD LENS |
| 6 | -0.970 | 0.080 | | | |
| 7 | -2.864 | 0.300 | 1.620 | 25.6 | FOURTH LENS |
| 8 | -100.000 | 0.080 | | | |
| 9 | 13.780 | 0.482 | 1.537 | 56.3 | FIFTH LENS |
| 10 | -6.201 | 0.080 | | | |
| 11 | 1.905 | 0.649 | 1.537 | 56.3 | SIXTH LENS |
| 12 | 1.110 | 0.373 | | | |
| 13 | Infinity | 0.300 | 1.517 | 64.2 | FILTER |
| 14 | Infinity | 0.234 | | | |
| IMAGE PLANE | Infinity | – | – | – | |

FIG. 15

| Ex.4 | CONIC (k) | 4TH ORDER (A) | 6TH ORDER (B) | 8TH ORDER (C) | 10TH ORDER (D) | 12TH ORDER (E) | 14TH ORDER (F) |
|---|---|---|---|---|---|---|---|
| 1 | 0.00000 | -0.01658 | 0.07983 | -0.10329 | 0.02151 | 0.00000 | 0.00000 |
| 2 | 0.00000 | -0.15776 | 0.65628 | -0.99229 | 0.87864 | 0.00000 | 0.00000 |
| 3 | 0.00000 | -0.23985 | 0.53839 | -0.93669 | 0.82008 | 0.00000 | 0.00000 |
| 4 | 0.00000 | -0.11481 | -0.10176 | 0.30123 | -0.34399 | 0.00000 | 0.00000 |
| 5 | 0.00000 | -0.17411 | -0.11830 | 0.63944 | -1.28307 | 0.00000 | 0.00000 |
| 6 | 0.00000 | -0.00229 | -0.03889 | 0.05752 | -0.01109 | 0.00000 | 0.00000 |
| 7 | 0.00000 | -0.02501 | -0.28178 | 0.19116 | -0.23345 | 0.00000 | 0.00000 |
| 8 | 0.00000 | -0.06736 | -0.00670 | -0.00082 | 0.01729 | 0.00000 | 0.00000 |
| 9 | 0.00000 | 0.01177 | -0.02613 | 0.01999 | -0.00512 | 0.00000 | 0.00000 |
| 10 | 0.00000 | 0.03123 | -0.02877 | 0.01777 | -0.00393 | 0.00000 | 0.00000 |
| 11 | 0.00000 | -0.30319 | 0.11907 | -0.02169 | 0.00018 | 0.00013 | 0.00000 |
| 12 | -1.00000 | -0.32486 | 0.18137 | -0.07763 | 0.02108 | -0.00319 | 0.00020 |

FIG. 16

LENS MODULE

CROSS-REFERENCE TO RELATED APPLICATION(S)

This application claims the benefit under 35 USC 119(a) of Korean Patent Application No. 10-2014-0175021 filed on Dec. 8, 2014, in the Korean Intellectual Property Office, the entire disclosure of which is incorporated herein by reference for all purposes.

BACKGROUND

1. Field

This application relates to a lens module having an optical system including six lenses.

2. Description of Related Art

A lens module mounted in a camera of a mobile communications terminal includes a plurality of lenses. For example, a lens module includes six lenses to configure an optical system having a high resolution.

However, when the optical system having a high resolution is configured using the plurality of lenses as described above, a length (a distance from an object-side surface of a first lens to an image plane) of the optical system may be increased. In this case, it is difficult to install the lens module in a slim mobile communications terminal.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a lens module includes a first lens having negative refractive power, an object-side surface thereof being convex and an image-side surface thereof being concave; a second lens having an object-side surface that is convex; a third lens having an object-side surface that is concave and an image-side surface that is convex; a fourth lens having an object-side surface that is concave; a fifth lens having an object-side surface that is concave and an image-side surface that is convex; and a sixth lens having an object-side surface that is convex and having one or more inflection points on an image-side surface thereof; wherein the first to sixth lenses are sequentially disposed in numerical order from the first lens to the sixth lens from an object side of the lens module toward an image side of the lens module.

An image-side surface of the second lens may be concave.
An image-side surface of the fourth lens may be convex.
The image-side surface of the sixth lens may be concave.
The second lens may have positive refractive power.
The third lens may have positive refractive power.

In another general aspect, a lens module includes a first lens having negative refractive power, an object-side surface thereof being convex and an image-side surface thereof being concave; a second lens having an object-side surface that is convex and an image-side surface that is convex; a third lens having an object-side surface that is concave and an image-side surface that is convex; a fourth lens having an object-side surface that is concave; a fifth lens having an image-side surface that is convex; and a sixth lens having an object-side surface that is convex and having one or more inflection points on an image-side surface thereof; wherein the first to sixth lenses are sequentially disposed in numerical order from the first lens to the sixth lens starting from an object side of the lens module toward an image side of the lens module.

An image-side surface of the fourth lens may be convex.
An object-side surface of the fifth lens may be convex.
The image-side surface of the sixth lens may be concave.

In another general aspect, a lens module includes a first lens having negative refractive power, an object-side surface thereof being convex; a second lens having positive refractive power; a third lens having positive refractive power, an object-side surface thereof being concave; a fourth lens having refractive power; a fifth lens having refractive power, an object-side surface thereof being concave and an image-side surface thereof being convex; a sixth lens having negative refractive power and having one or more inflection points on an image-side surface thereof; wherein the first to sixth lenses are sequentially disposed in numerical order from the first lens to the sixth lens starting from an object side of the lens module toward an image side of the lens module.

The fourth lens may have negative refractive power.
The fifth lens may have positive refractive power.
An object-side surface of the fourth lens may be concave.
An image-side surface of the fourth lens may be convex.

Other features and aspects will be apparent from the following detailed description, the drawings, and the claims.

BRIEF DESCRIPTION OF THE DRAWINGS

FIG. 3 is a table listing characteristics of the lenses of the lens module illustrated in FIG. 1
FIG. 4 is a table listing aspheric coefficients of the lenses of the lens module illustrated in FIG. 1.
FIG. 7 is a table listing characteristics of the lenses of the lens module illustrated in FIG. 5.
FIG. 8 is a table listing aspheric coefficients of the lenses of the lens module illustrated in FIG. 5.
FIG. 11 is a table listing characteristics of the lenses of the lens module illustrated in FIG. 9.
FIG. 12 is a table listing aspheric coefficients of the lenses of the lens module illustrated in FIG. 9.
FIG. 15 is a table listing characteristics of the lenses of the lens module illustrated in FIG. 13.
FIG. 16 is a table listing aspheric coefficients of the lenses of the lens module illustrated in FIG. 13.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
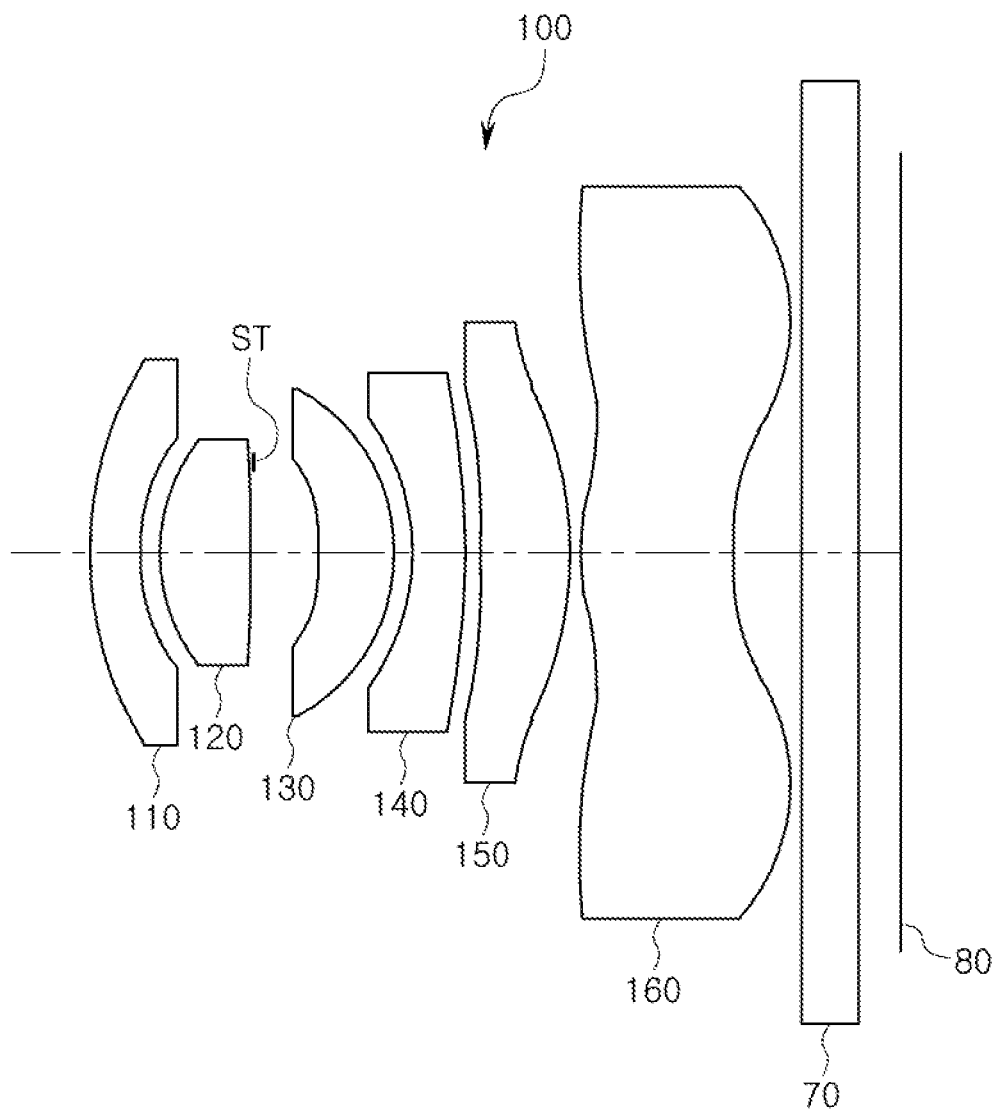
FIG. 1 is a view of a first example of a lens module.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

In this application, a first lens refers to a lens closest to an object (or a subject), while a sixth lens refers to a lens closest to an image plane (or an image sensor). Further, a first surface of each lens refers to a surface thereof closest to an object (or a subject), and a second surface of each lens refers to a surface thereof closest to an image plane (or an image sensor). Further, all of radii of curvature, thicknesses, OALs (optical axis distances from a first surface of the first lens to the image plane), SLs (distances from a stop to an image plane), IMGHs (image heights), and BFLs (back focus lengths) of the lenses, an overall focal length of an optical system, and a focal length of each lens are expressed in millimeters (mm). Additionally, thicknesses of lenses, gaps between the lenses, OALs, and SLs are distances measured based on an optical axis of the lenses. Further, in a description for shapes of the lenses, a statement that one surface of a lens is convex means that an optical axis portion of a corresponding surface is convex, and a statement that one surface of a lens is concave means that an optical axis portion of a corresponding surface is concave. Therefore, although it may be stated that one surface of a lens is convex, an edge portion of the lens may be concave. Likewise, although it may be stated that one surface of a lens is concave, an edge portion of the lens may be convex.

A lens module includes an optical system including a plurality of lenses. For example, the optical system of the lens module may include six lenses having refractive power. However, the lens module is not limited to only including the six lenses. For example, the lens module may include other components that do not have refractive power. For example, the lens module may include a stop controlling an amount of light. As another example, the lens module may further include an infrared cut-off filter filtering infrared light. As another example, the lens module may further include an image sensor (that is, an imaging device) converting an image of a subject incident thereon through the optical system into electrical signals. As another example, the lens module may further include a gap maintaining member adjusting a gap between lenses.

First to sixth lenses may be formed of materials having a refractive index different from that of air. For example, the first to sixth lenses may be formed of plastic or glass. At least one of the first to sixth lenses may have an aspheric shape. For example, only the sixth lens of the first to sixth lenses may have an aspheric shape. As another example, at least one surface of all of the first to sixth lenses may be aspherical. Here, the aspherical surface of each lens may be represented by the following Equation 1:

$$Z = \frac{cr^2}{1 + \sqrt{1-(1+k)c^2r^2}} + Ar^4 + Br^6 + Cr^8 + Dr^{10} + Er^{12} + Fr^{14} + Gr^{16} + Hr^{18} + Jr^{20} \quad (1)$$

Here, c is an inverse of a radius of curvature of a corresponding lens, k is a conic constant, and r is a distance from a certain point on an aspherical surface to an optical axis in a direction perpendicular to the optical axis. In addition, constants A to J are respectively 4th order to 20th order aspheric coefficients. In addition, Z is a distance between the certain point on the aspherical surface at the distance r and a tangential plane meeting the apex of the aspherical surface of the lens.

The optical system of the lens module may have a wide field of view (FOV) of 75° or more. Therefore, the lens module may easily photograph a wide background or object.

Next, main components of the lens module will be described.

The first lens may have refractive power. For example, the first lens may have negative refractive power.

The first lens may be convex toward an object side. For example, a first surface (object-side surface) of the first lens may be convex and a second surface (image-side surface) thereof may be concave.

The first lens may have an aspherical surface. For example, both surfaces of the first lens may be aspherical. The first lens may be formed of a material having high light transmissivity and excellent workability. For example, the first lens may be formed of plastic. However, a material of the first lens is not limited to plastic. For example, the first lens may be formed of glass.

The first lens may be formed of a material having a high refractive index. For example, the first lens may be formed of a material having a refractive index of 1.60 or more (in this case, the first lens may have an Abbe number of 30 or less). The first lens formed of this material may easily refract light even while having a small curvature. Therefore, the first lens formed of this material may be easily manufactured and be advantageous in lowering a defect rate depending on a manufacturing tolerance. In addition, the first lens formed of this material may decrease a distance between lenses, and thus it may be advantageous in miniaturizing the lens module.

The second lens may have refractive power. For example, the second lens may have positive refractive power.

One surface of the second lens may be convex. For example, a first surface of the second lens may be convex, and a second surface thereof may be concave. As another example, a first surface of the second lens may be convex, and a second surface of the second lens may be convex.

The second lens may have an aspherical surface. For example, both surfaces of the second lens may be aspherical. The second lens may be formed of a material having high light transmissivity and excellent workability. For example, the second lens may be formed of plastic. However, a material of the second lens is not limited to plastic. For example, the second lens may be formed of glass.

The third lens may have refractive power. For example, the third lens may have positive refractive power.

The third lens may have a meniscus shape of which an image-side surface is convex. For example, a first surface of the third lens may be concave, and a second surface of the third lens may be convex.

The third lens may have an aspherical surface. For example, both surfaces of the third lens may be aspherical. The third lens may be formed of a material having high light transmissivity and excellent workability. For example, the third lens may be formed of plastic. However, a material of the third lens is not limited to plastic. For example, the third lens may be formed of glass.

The fourth lens may have refractive power. For example, the fourth lens may have negative refractive power.

The fourth lens may have a meniscus shape of which an image-side surface is convex. For example, a first surface of the fourth lens may be concave and a second surface of the fourth lens may be convex.

The fourth lens may have an aspherical surface. For example, both surfaces of the fourth lens may be aspherical. The fourth lens may be formed of a material having high light transmissivity and excellent workability. For example, the fourth lens may be formed of plastic. However, a material of the fourth lens is not limited to plastic. For example, the fourth lens may be formed of glass.

The fourth lens may be formed of a material having a high refractive index. For example, the fourth lens may be formed of a material having a refractive index of 1.60 or more (in this case, the fourth lens may have an Abbe number of 30 or less). The fourth lens formed of this material may easily refract light even while having a small curvature. Therefore, the fourth lens formed of this material may be easily manufactured and be advantageous in lowering a defect rate depending on a manufacturing tolerance. In addition, the fourth lens formed of this material may decrease a distance between lenses, and thus it may be advantageous in miniaturizing the lens module.

The fifth lens may have refractive power. For example, the fifth lens may have positive refractive power.

The fifth lens may be convex toward an image side. For example, a first surface of the fifth lens may be concave and a second surface thereof may be convex.

The fifth lens may have an aspherical surface. For example, both surfaces of the fifth lens may be aspherical. In addition, the fifth lens may have an aspheric shape including an inflection point. For example, one or more inflection points may be formed on an image-side surface of the fifth lens.

The fifth lens may be formed of a material having high light transmissivity and excellent workability. For example, the fifth lens may be formed of plastic. However, a material of the fifth lens is not limited to plastic. For example, the fifth lens may be formed of glass.

The sixth lens may have refractive power. For example, the sixth lens may have negative refractive power.

The sixth lens may have a meniscus shape of which an object-side surface is convex. For example, a first surface of the sixth lens may be convex, and a second surface of the sixth lens may be concave.

The sixth lens may have an aspherical surface. For example, both surfaces of the sixth lens may be aspherical. In addition, the sixth lens may have an aspheric shape including an inflection point. For example, one or more inflection points may be formed on an object-side surface and an image-side surface of the sixth lens. The first surface of the sixth lens having the inflection point may be convex at the center of an optical axis, be concave in the vicinity of the optical axis, and again be convex at an edge thereof. In addition, the second surface of the sixth lens may be concave at the center of an optical axis and become convex at an edge thereof. The sixth lens may be formed of a material having high light transmissivity and high workability. For example, the sixth lens may be formed of plastic. However, a material of the sixth lens is not limited to plastic. For example, the sixth lens may be formed of glass.

The image sensor may have a high resolution of 1300 megapixels. For example, a unit size of the pixels of the image sensor may be 1.12 μm or less.

The lens module described above may have a wide field of view. For example, the optical system of the lens module may have a field of view of 75° or more. In addition, the lens module may have a relatively short length (TTL). For example, an overall length (distance from the object-side surface of the first lens to the image plane) of the optical system of the lens module may be 4.50 mm or less. Therefore, the lens module may be advantageously miniaturized.

The optical system of the lens module configured as described above may satisfy the following Conditional Expressions:

$$20<|V1-V2|$$

$$20<V3-V4$$

Here, V1 is an Abbe number of the first lens, V2 is an Abbe number of the second lens, V3 is an Abbe number of the third lens, and V4 is an Abbe number of the fourth lens.

The above Conditional Expressions may be conditions for selecting materials of the first to fourth lenses. In a case in which the above Conditional Expressions are satisfied, the optical system may easily correct chromatic aberration and aberration through the first to fifth lenses.

FIG. 1 is a view of a first example of a lens module.

A lens module 100 includes an optical system including a first lens 110, a second lens 120, a third lens 130, a fourth lens 140, a fifth lens 150, and a sixth lens 160. In addition, the lens module 100 further includes an infrared cut-off filter 70 and an image sensor 80. Further, the lens module 100 includes a stop (ST). In this example, the stop disposed between the second lens 120 and the third lens 130.

In this example, the first lens 110 has negative refractive power, and an object-side surface thereof is convex and an image-side surface thereof is concave. The second lens 120 has positive refractive power, and an object-side surface thereof is convex and an image-side surface thereof is concave. The third lens 130 has positive refractive power, and an object-side surface thereof is concave and an image-side surface thereof is convex. The fourth lens 140 has negative refractive power, and an object-side surface thereof is concave and an image-side surface thereof is convex. The fifth lens 150 has positive refractive power, and an object-side surface thereof is concave and an image-side surface thereof is convex. The sixth lens 160 has negative refractive power, and an object-side surface thereof is convex and an image-side surface thereof is concave. In addition, one or more inflection points are formed on each of the object-side surface and the image-side surface of the sixth lens 160.

In this example, all of the first lens 110, the fourth lens 140, and the sixth lens 160 have negative refractive power as described above. Among these lenses, the sixth lens 160 has the strongest refractive power, and the fourth lens 140 has the weakest refractive power.

Figure 2:
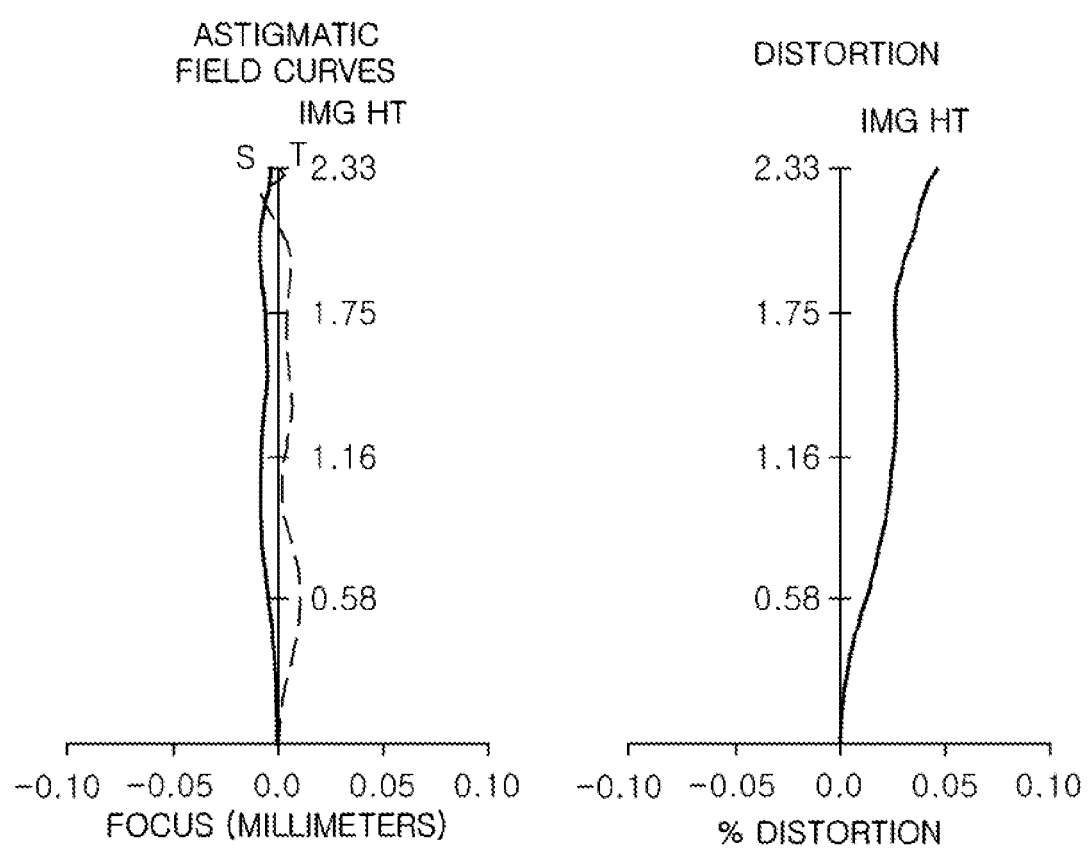
FIG. 2 illustrates graphs including curves representing aberration characteristics of the lens module illustrated in FIG. 1.

FIG. 2 illustrates graphs including curves representing aberration characteristics of the lens module illustrated in FIG. 1.

FIG. 3 is a table listing characteristics of the lenses of the lens module illustrated in FIG. 1. In FIG. 3, Surface Nos. 1 and 2 indicate the first surface (object-side surface) and the second surface (image-side surface) of the first lens, and Surface Nos. 3 and 4 indicate the first and second surfaces of the second lens. Similarly, Surface Nos. 5 to 12 indicate first and second surfaces of the third to sixth lenses, respectively. In addition, Surface Nos. 13 and 14 indicate first and second surfaces of the infrared cut-off filter.

FIG. 4 is a table listing aspheric coefficients of the lenses of the lens module illustrated in FIG. 1. In FIGS. 4, 1 to 12 in a first column of the table indicate Surface Nos. of the first to sixth lenses.

Figure 5:
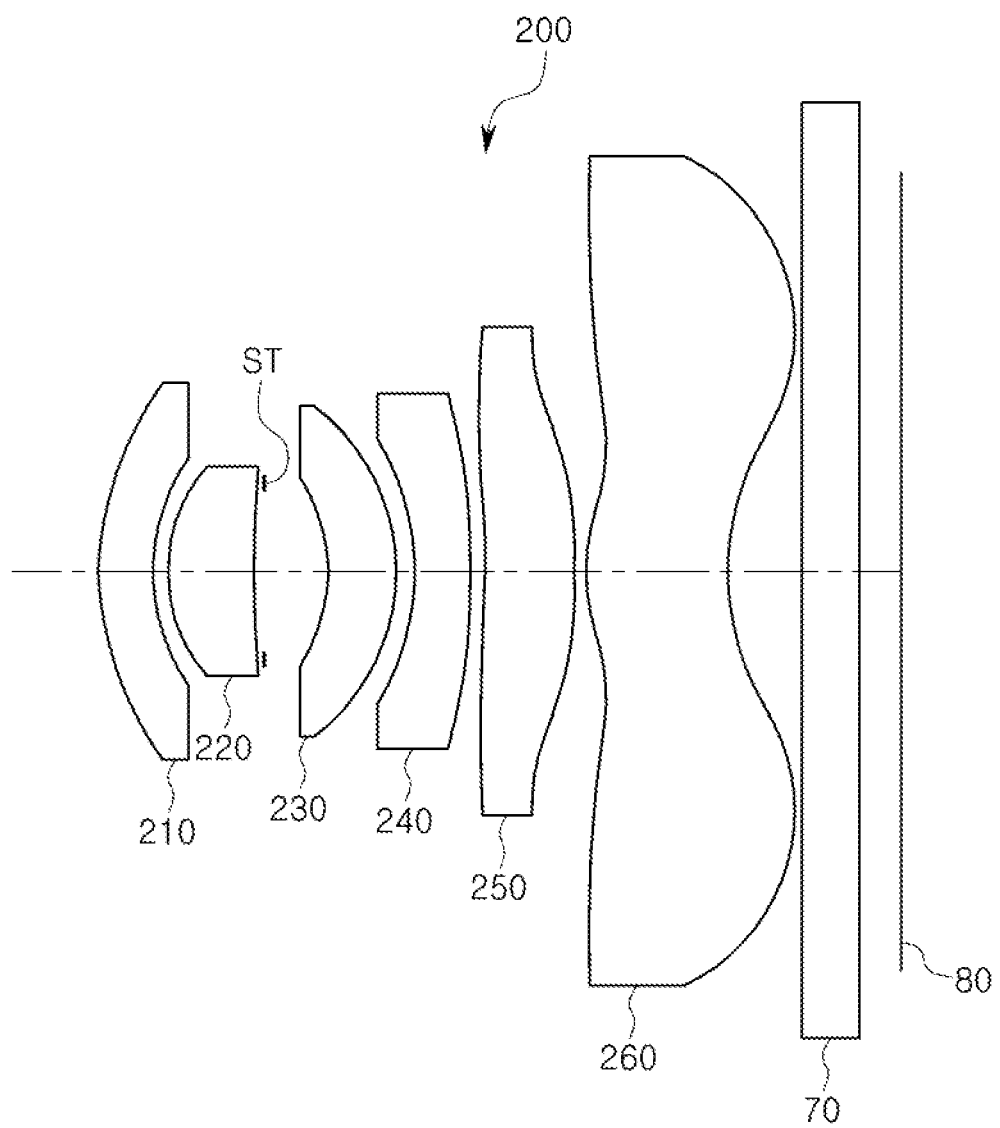
FIG. 5 is a view of a second example of a lens module.

FIG. 5 is a view of a second example of a lens module.

A lens module 200 includes an optical system including a first lens 210, a second lens 220, a third lens 230, a fourth lens 240, a fifth lens 250, and a sixth lens 260. In addition, the lens module 200 further includes an infrared cut-off filter 70 and an image sensor 80. Further, the lens module 200 includes a stop (ST). In this example, the stop is disposed between the second lens 220 and the third lens 230.

In this example, the first lens 210 has negative refractive power, and an object-side surface thereof is convex and an image-side surface thereof is concave. The second lens 220 has positive refractive power, and an object-side surface thereof is convex and an image-side surface thereof is concave. The third lens 230 has positive refractive power, and an object-side surface thereof is concave and an image-side surface thereof is convex. The fourth lens 240 has negative refractive power, and an object-side surface thereof is concave and an image-side surface thereof is convex. The fifth lens 250 has positive refractive power, and an object-side surface thereof is concave and an image-side surface thereof is convex. The sixth lens 260 has negative refractive power, and an object-side surface thereof is convex and an image-side surface thereof is concave. In addition, one or more inflection points are formed on each of the object-side surface and the image-side surface of the sixth lens 260.

In this example, all of the first lens 210, the fourth lens 240, and the sixth lens 260 have negative refractive power as described above. Among these lenses, the sixth lens 260 has the strongest refractive power, and the fourth lens 240 has the weakest refractive power.

Figure 6:
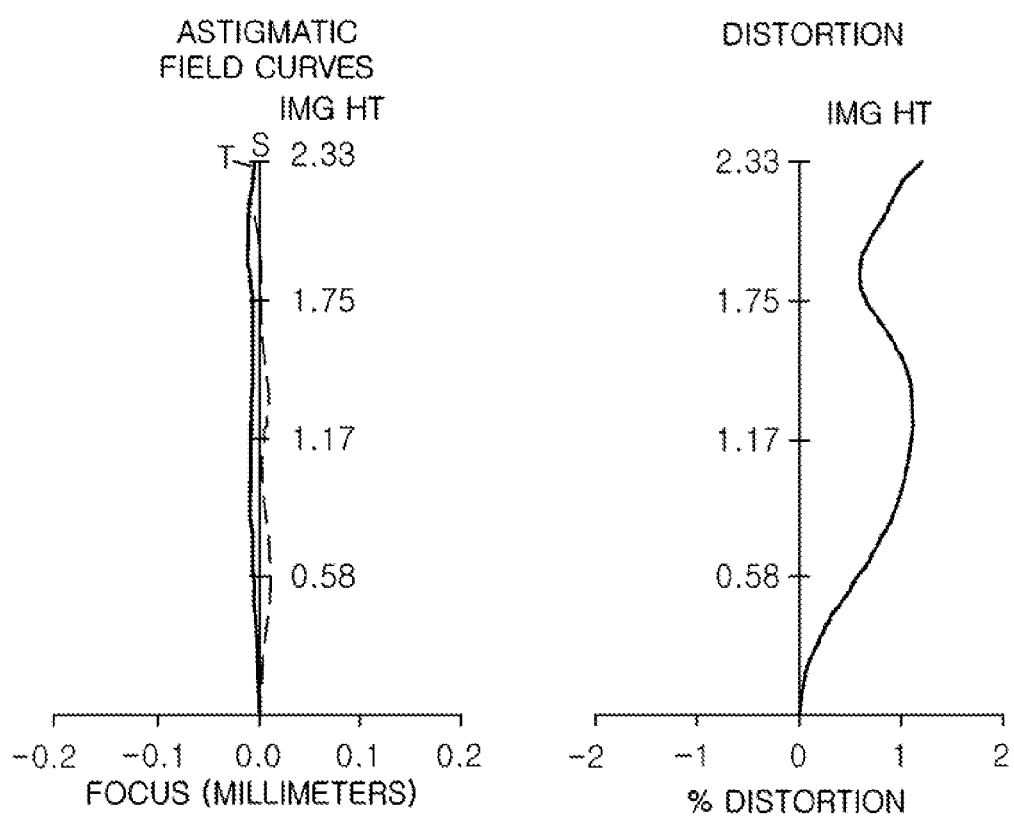
FIG. 6 illustrates graphs including curves representing aberration characteristics of the lens module illustrated in FIG. 5.

FIG. 6 illustrates graphs including curves representing aberration characteristics of the lens module illustrated in FIG. 5.

FIG. 7 is a table listing characteristics of the lenses of the lens module illustrated in FIG. 5. In FIG. 7, Surface Nos. 1 and 2 indicate the first surface (object-side surface) and the second surface (image-side surface) of the first lens, and Surface Nos. 3 and 4 indicate the first and second surfaces of the second lens. Similarly, Surface Nos. 5 to 12 indicate first and second surfaces of the third to sixth lenses, respectively. In addition, Surface Nos. 13 and 14 indicate first and second surfaces of the infrared cut-off filter.

FIG. 8 is a table listing aspheric coefficients of the lenses of the lens module illustrated in FIG. 5. In FIGS. 8, 1 to 12 in a first column of the table indicate Surface Nos. of the first to sixth lenses.

Figure 9:
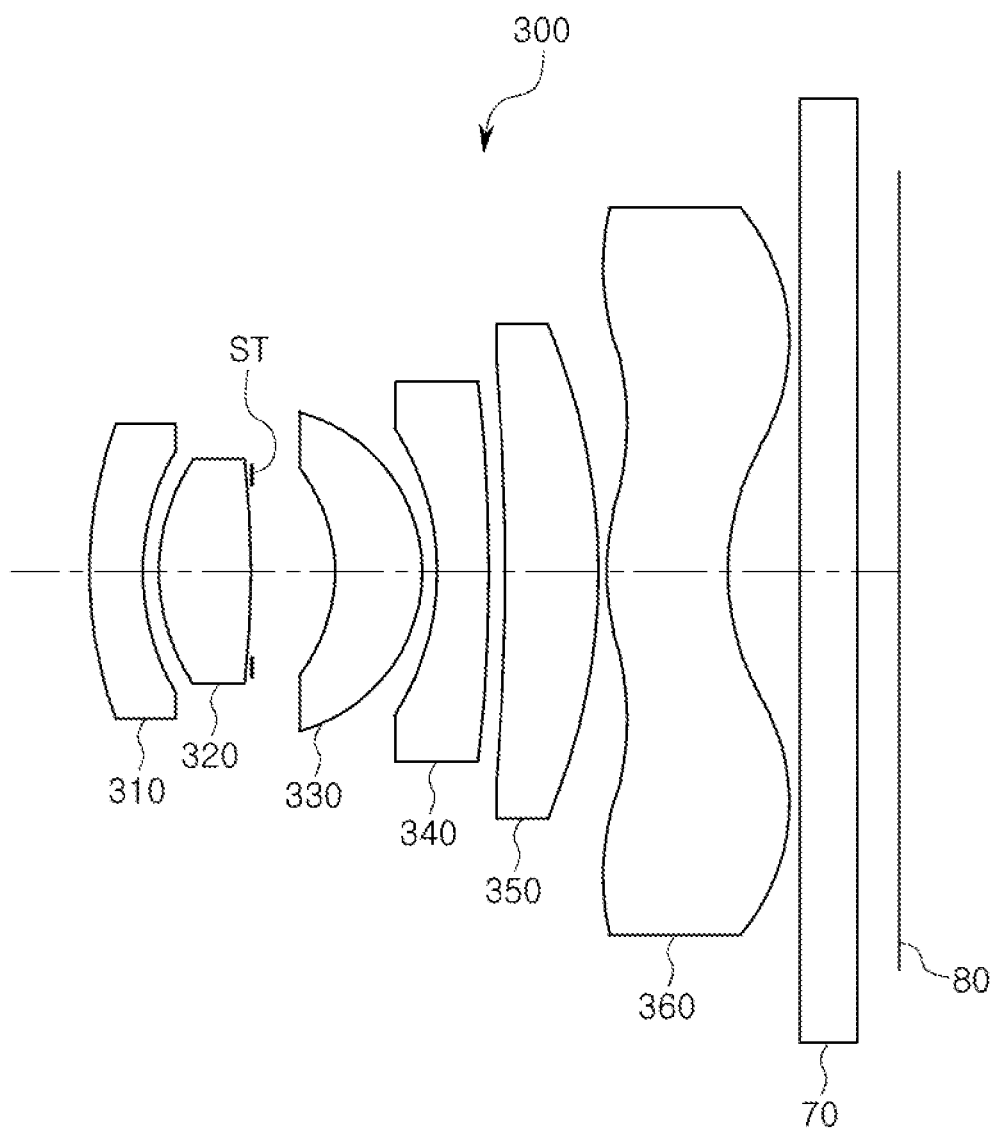
FIG. 9 is a view of a third example of a lens module.

FIG. 9 is a view of a third example of a lens module.

A lens module 300 includes an optical system including a first lens 310, a second lens 320, a third lens 330, a fourth lens 340, a fifth lens 350, and a sixth lens 360. In addition, the lens module 300 further includes an infrared cut-off filter 70 and an image sensor 80. Further, the lens module 300 includes a stop (ST). In this example, the stop is disposed between the second lens 320 and the third lens 330.

In this example, the first lens 310 has negative refractive power, and an object-side surface thereof is convex and an image-side surface thereof is concave. The second lens 320 has positive refractive power, and an object-side surface thereof is convex and an image-side surface thereof is convex. The third lens 330 has positive refractive power, and an object-side surface thereof is concave and an image-side surface thereof is convex. The fourth lens 340 has negative refractive power, and an object-side surface thereof is concave and an image-side surface thereof is convex. The fifth lens 350 has positive refractive power, and an object-side surface thereof is concave and an image-side surface thereof is convex. The sixth lens 360 has negative refractive power, and an object-side surface thereof is convex and an image-side surface thereof is concave. In addition, one or more inflection points are formed on each of the object-side surface and the image-side surface of the sixth lens 360.

In this example, all of the first lens 310, the fourth lens 340, and the sixth lens 360 have negative refractive power as described above. Among these lenses, the sixth lens 360 has the strongest refractive power, and the fourth lens 340 has the weakest refractive power.

Figure 10:
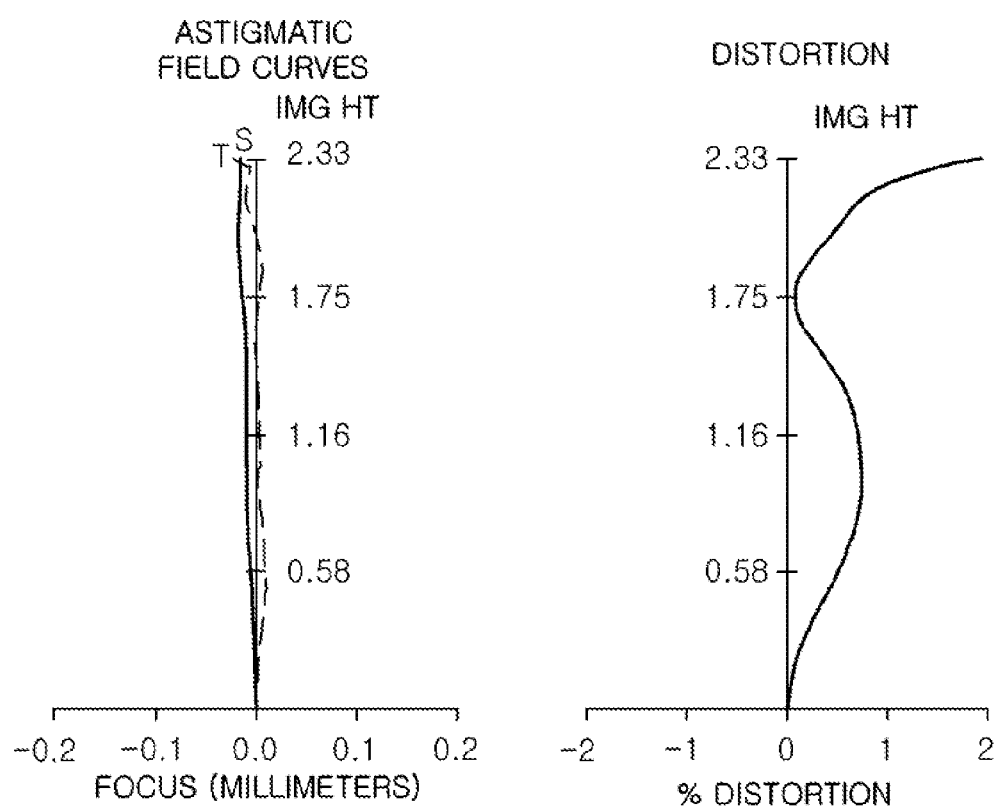
FIG. 10 illustrates graphs including curves representing aberration characteristics of the lens module illustrated in FIG. 9.

FIG. 10 illustrates graphs including curves representing aberration characteristics of the lens module illustrated in FIG. 9.

FIG. 11 is a table listing characteristics of the lenses of the lens module illustrated in FIG. 9. In FIG. 11, Surface Nos. 1 and 2 indicate the first surface (object-side surface) and the second surface (image-side surface) of the first lens, and Surface Nos. 3 and 4 indicate the first and second surfaces of the second lens. Similarly, Surface Nos. 5 to 12 indicate first and second surfaces of the third to sixth lenses, respectively. In addition, Surface Nos. 13 and 14 indicate first and second surfaces of the infrared cut-off filter.

FIG. 12 is a table listing aspheric coefficients of the lenses of the lens module illustrated in FIG. 9. In FIGS. 12, 1 to 12 in a first column of the table indicate Surface Nos. of the first to sixth lenses.

Figure 13:
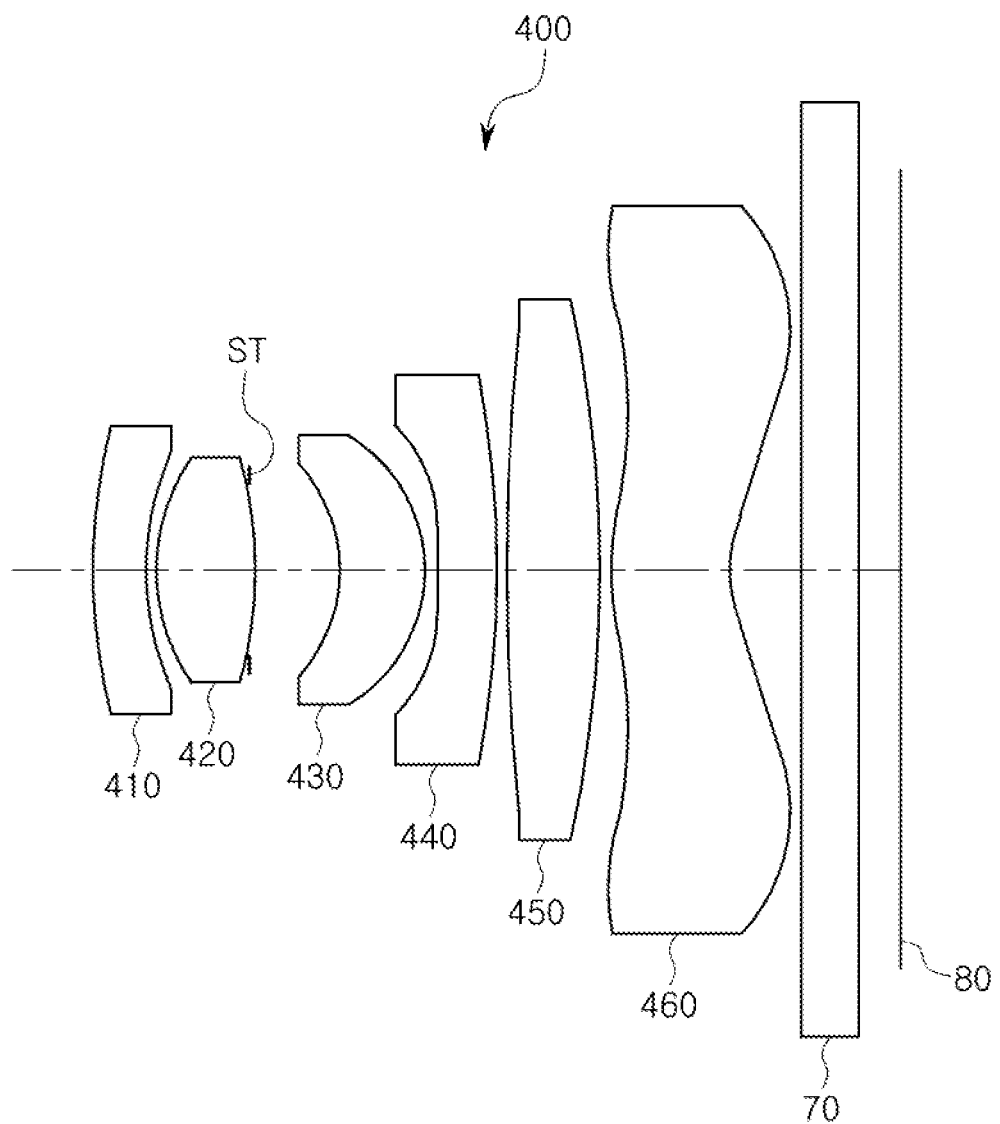
FIG. 13 is a view of a fourth example of a lens module.

FIG. 13 is a view of a fourth example of a lens module.

A lens module 400 includes an optical system including a first lens 410, a second lens 420, a third lens 430, a fourth lens 440, a fifth lens 450, and a sixth lens 460. In addition, the lens module 400 further includes an infrared cut-off filter 70 and an image sensor 80. Further, the lens module 400 includes a stop (ST). For example, the stop is disposed between the second lens 420 and the third lens 430.

In this example, the first lens 410 has negative refractive power, and an object-side surface thereof is convex and an image-side surface thereof is concave. The second lens 420 has positive refractive power, and an object-side surface thereof is convex and an image-side surface thereof is convex. The third lens 430 has positive refractive power, and an object-side surface thereof is concave and an image-side surface thereof is convex. The fourth lens 440 has negative refractive power, and an object-side surface thereof is concave and an image-side surface thereof is convex. The fifth lens 450 has positive refractive power, and an object-side surface thereof is concave and an image-side surface thereof is convex. The sixth lens 460 has negative refractive power, and an object-side surface thereof is convex and an image-side surface thereof is concave. In addition, one or more inflection points are formed on each of the object-side surface and the image-side surface of the sixth lens 460.

In this example, all of the first lens 410, the fourth lens 440, and the sixth lens 460 have negative refractive power as described above. Among these lenses, the sixth lens 460 has the strongest refractive power, and the fourth lens 440 has the weakest refractive power.

Figure 14:
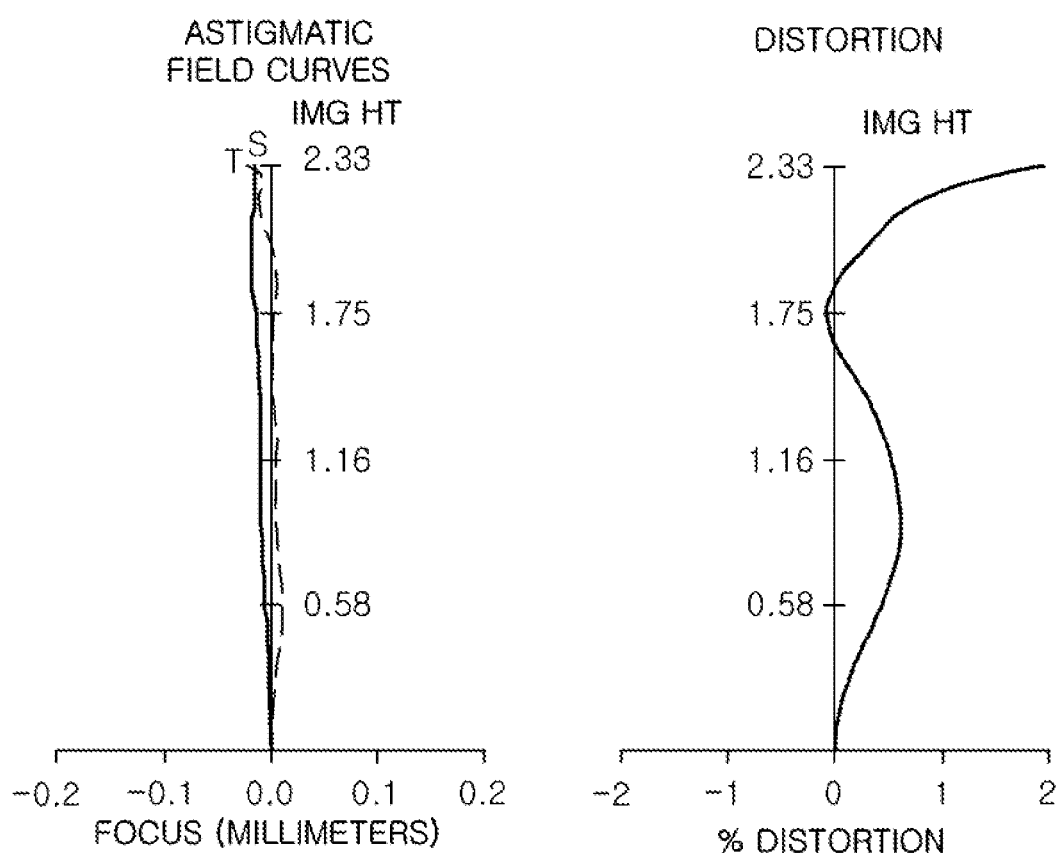
FIG. 14 illustrates graphs including curves representing aberration characteristics of the lens module illustrated in FIG. 13.

FIG. 14 illustrates graphs including curves representing aberration characteristics of the lens module illustrated in FIG. 13.

FIG. 15 is a table listing characteristics of the lenses of the lens module illustrated in FIG. 13. In FIG. 15, Surface Nos. 1 and 2 indicate the first surface (object-side surface) and the second surface (image-side surface) of the first lens, and Surface Nos. 3 and 4 indicate the first and second surfaces of the second lens. Similarly, Surface Nos. 5 to 12 indicate first and second surfaces of the third to sixth lenses, respectively. In addition, Surface Nos. 13 and 14 indicate first and second surfaces of the infrared cut-off filter.

FIG. 16 is a table listing aspheric coefficients of the lenses of the lens module illustrated in FIG. 13. In FIGS. 16, 1 to 12 in a first column of the table indicate Surface Nos. of the first to sixth lenses.

The following Table 1 lists optical characteristics of the lens modules of the first to fourth examples. The lens module has an overall focal length (f) of 2.80 to 3.00. A focal length (f1) of the first lens determined to be in a range of −7.0 to −5.0. A focal length (f2) of the second lens is determined to be in a range of 1.70 to 2.00. A focal length (f3) of the third lens is determined to be in a range of 5.0 to 8.0. A focal length (f4) of the fourth lens is determined to be in a range of −6.0 to −3.0. A focal length (f5) of the fifth lens is determined to be in a range of 5.0 to 9.0. A focal length (f6) of the sixth lens is determined to be in a range of −10.0 to −5.0. An overall length (TTL) of the optical system is determined to be in a range of 4.20 to 4.60. A field of view (FOV) of the lens module is in a range of 75.0° to 80.0°.

TABLE 1

| Remark | First Example | Second Example | Third Example | Fourth Example |
|---|---|---|---|---|
| f | 2.9140 | 2.9150 | 2.9150 | 2.9150 |
| f1 | −5.7890 | −5.9510 | −6.0610 | −6.0490 |
| f2 | 1.8280 | 1.8800 | 1.8180 | 1.8320 |
| f3 | 5.7950 | 6.6360 | 7.0820 | 7.0560 |
| f4 | −4.0980 | −4.0000 | −5.0480 | −4.7620 |
| f5 | 7.7230 | 5.5190 | 8.2050 | 8.0330 |
| f6 | −9.1860 | −8.1360 | −6.4160 | −6.9230 |
| TTL | 4.4263 | 4.3564 | 4.3559 | 4.3632 |
| FOV | 77.291 | 77.272 | 77.272 | 77.272 |

The following Table 2 lists values of various parameters of the lens modules of the first to fourth examples.

TABLE 2

| Parameters | First Example | Second Example | Third Example | Fourth Example |
|---|---|---|---|---|
| f1/f | −1.98662 | −2.04151 | −2.07925 | −2.07513 |
| f2/f | 0.62732 | 0.64494 | 0.62367 | 0.62847 |
| f3/f | 1.98868 | 2.27650 | 2.42950 | 2.42058 |
| f4/f | −1.40631 | −1.37221 | −1.73173 | −1.63362 |
| f5/f | 2.65031 | 1.89331 | 2.81475 | 2.75575 |
| f6/f | −3.15237 | −2.79108 | −2.20103 | −2.37496 |

As seen in Table 2, the parameters of the optical systems of the first to fourth examples satisfy the following Conditional Expressions.

$$-3.0 < f1/f$$

$$f2/f < 0.8$$

$$f3/f < 3.0$$

$$-2.5 < f4/f < -1.2$$

$$1.5 < f5/f$$

$$-6.0 < f6/f < -2.0$$

$$0.27 < 1/f1 + 1/f2 + 1/f3 + 1/f4 + 1/f5 + 1/f6 < 0.37$$

Here, f is an overall focal length of the optical system including the first to sixth lenses, f1 is a focal length of the first lens, f2 is a focal length of the second lens, f3 is a focal length of the third lens, f4 is a focal length of the fourth lens, f5 is a focal length of the fifth lens, and f6 is a focal length of the sixth lens.

The above Conditional Expressions are numerical limitations for appropriately distributing refractive powers of the first to sixth lenses. For example, when the sum of the refractive powers of the first to sixth lenses falls within the numerical range of 0.27 to 0.37 in the last Conditional Expression listed above, it is advantageous in correcting aberration and realizing a high resolution.

The examples described above enable the optical system to have a high resolution.

While this disclosure includes specific examples, it will be apparent to one of ordinary skill in the art that various changes in form and details be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lens module comprising:
   a first lens comprising negative refractive power, an object-side surface that is convex, and an image-side surface that is concave;
   a second lens comprising an object-side surface that is convex;
   a third lens comprising an object-side surface that is concave and an image-side surface that is convex;
   a fourth lens comprising an object-side surface that is concave;
   a fifth lens comprising an object-side surface that is concave in a portion located at an optical axis region thereof, and an image-side surface that is convex in an optical axis portion thereof; and
   a sixth lens comprising an object-side surface that is convex and an image-side surface comprising one or more inflection points;
   wherein the first to sixth lenses are sequentially disposed in numerical order from the first lens to the sixth lens from an object side of the lens module toward an image side of the lens module.

2. The lens module of claim 1, wherein an image-side surface of the second lens is concave.

3. The lens module of claim 1, wherein an image-side surface of the fourth lens is convex.

4. The lens module of claim 1, wherein the image-side surface of the sixth lens is concave.

5. The lens module of claim 1, wherein the second lens has positive refractive power.

6. The lens module of claim 1, wherein the third lens has positive refractive power.

7. A lens module comprising:
   a first lens comprising negative refractive power, an object-side surface that is convex, and an image-side surface that is concave;
   a second lens comprising an object-side surface that is convex and an image-side surface that is convex;
   a third lens comprising an object-side surface that is concave and an image-side surface that is convex;
   a fourth lens comprising an object-side surface that is concave;
   a fifth lens comprising an object-side surface that is concave in a portion located at an optical axis region thereof, and an image-side surface that is convex in an optical axis portion thereof; and
   a sixth lens comprising an object-side surface that is convex and an image-side surface comprising one or more inflection points;
   wherein the first to sixth lenses are sequentially disposed in numerical order from the first lens to the sixth lens starting from an object side of the lens module toward an image side of the lens module.

8. The lens module of claim 7, wherein an image-side surface of the fourth lens is convex.

9. The lens module of claim 7, wherein an object-side surface of the fifth lens is convex.

10. The lens module of claim 7, wherein the image-side surface of the sixth lens is concave.

11. A lens module comprising:
    a first lens comprising negative refractive power and an object-side surface that is convex;
    a second lens comprising positive refractive power;
    a third lens comprising positive refractive power and an object-side surface that is concave;
    a fourth lens comprising refractive power;
    a fifth lens comprising refractive power, an object-side surface that is concave in a portion located at an optical axis region thereof, and an image-side surface that is convex in an optical axis portion thereof;
    a sixth lens comprising negative refractive power and an image-side surface that comprises one or more inflection points;
    wherein the first to sixth lenses are sequentially disposed in numerical order from the first lens to the sixth lens starting from an object side of the lens module toward an image side of the lens module.

12. The lens module of claim 11, wherein the fourth lens has negative refractive power.

13. The lens module of claim 11, wherein the fifth lens has positive refractive power.

14. The lens module of claim 11, wherein an object-side surface of the fourth lens is concave.

15. The lens module of claim 11, wherein an image-side surface of the fourth lens is convex.

16. The lens module of claim 1, wherein a sum of the negative refractive power of the first lens and refractive powers of the second lens, the third lens, the fourth lens, the fifth lens and the sixth lens is 0.27 to 0.37.

17. The lens module of claim 1, wherein the lens module comprises a focal length (f) of 2.8 mm to 3.00 mm and an overall length (TTL) of 4.20 mm to 4.60 mm.

* * * * *